United States Patent
Lutchansky et al.

[15] 3,677,371
[45] July 18, 1972

[54] IMPACT ENERGY ABSORBER

[72] Inventors: Milton Lutchansky, Randolph Township; Warren Joseph Rhines, Convent Station, both of N.J.

[73] Assignee: Bell Telephone Laboratories, Incorporated, Murray Hill, N.J.

[22] Filed: Oct. 27, 1970

[21] Appl. No.: 84,407

[52] U.S. Cl. ........................ 188/1 C, 244/138 R, 267/154
[51] Int. Cl. ............................................. F16f 7/12
[58] Field of Search ............... 188/1 C; 244/138 R; 267/154

[56] References Cited

UNITED STATES PATENTS

| | | | |
|---|---|---|---|
| 3,239,207 | 3/1966 | Camossi | 267/154 |
| 3,374,865 | 3/1968 | Craig | 188/1 C |
| 3,568,806 | 3/1971 | Butt | 188/1 C |

Primary Examiner—Duane A. Reger
Attorney—R. J. Guenther, William L. Keefauver

[57] ABSTRACT

An impact energy absorber for preventing overloading of the tensile load in a suspension system carrying a mass which may have kinetic energy generated therein by high impact loading. The device transforms the tensile load into at least two tensile forces which are translated into two different torque loadings. Excessive torque loading causes a torsion member to yield and become permanently plastically deformed thus absorbing kinetic energy of the mass and thereby avoiding a break in the suspension system that might otherwise result from a sudden acceleration of the suspended mass. A modification of the device increases its energy absorption capacity. Another modification provides a more nearly constant load level during the yielding process.

5 Claims, 6 Drawing Figures

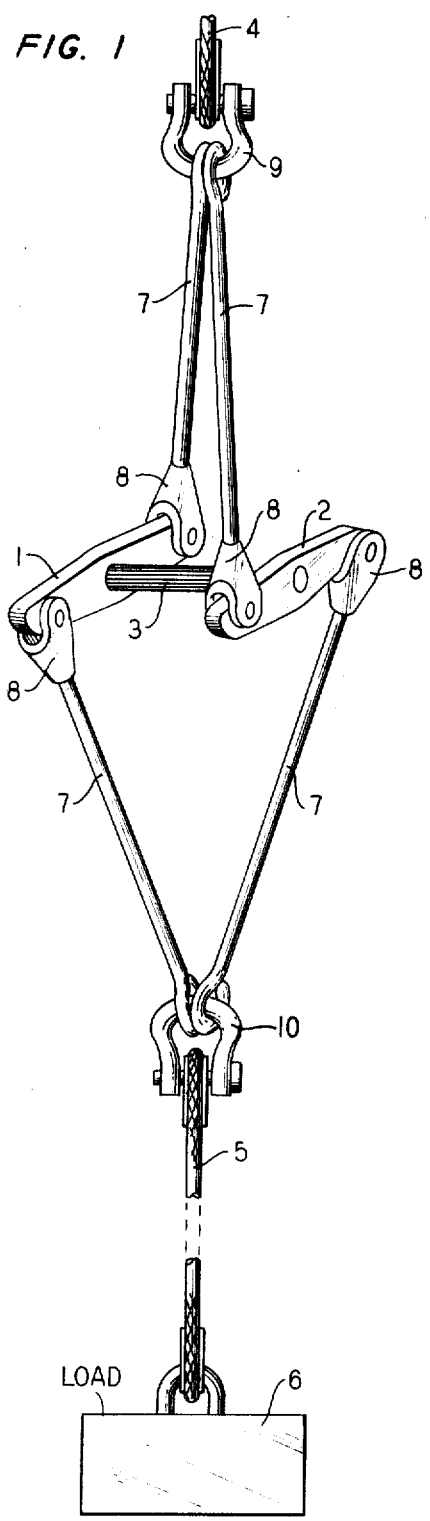
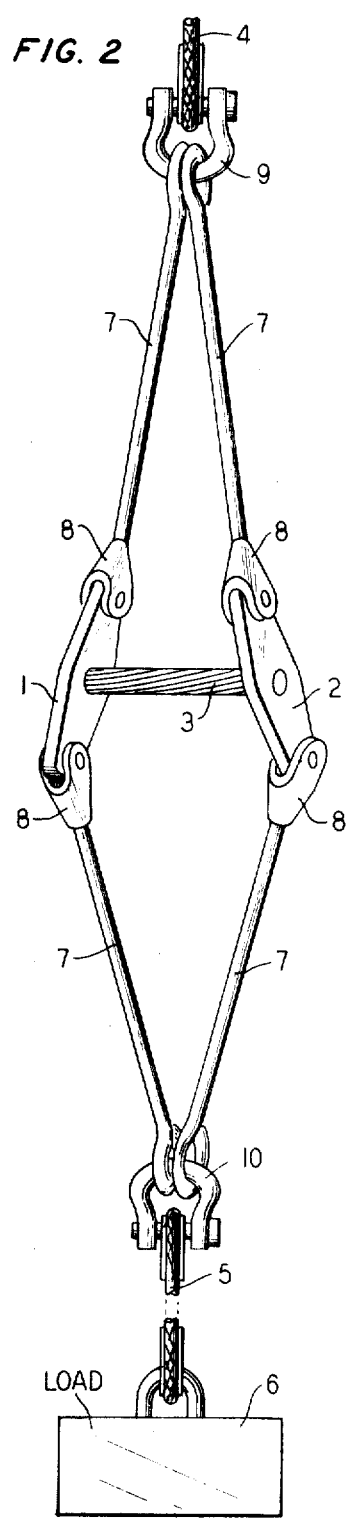

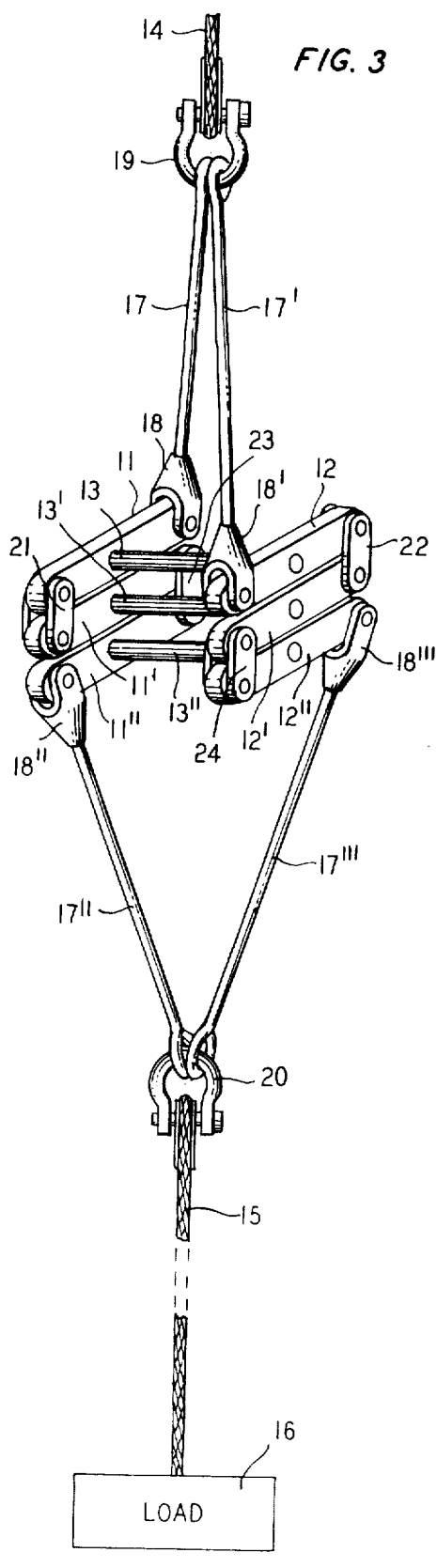
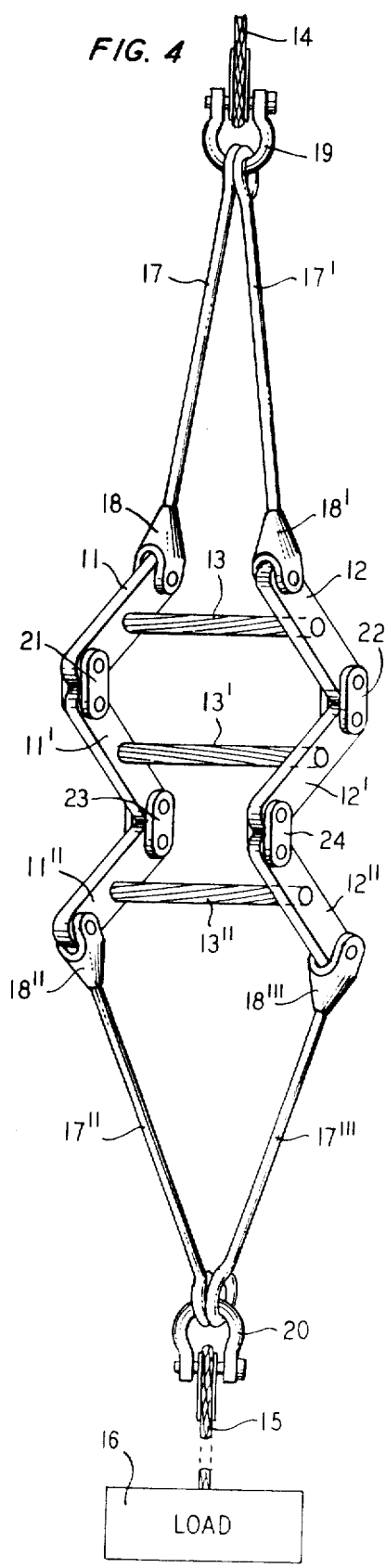

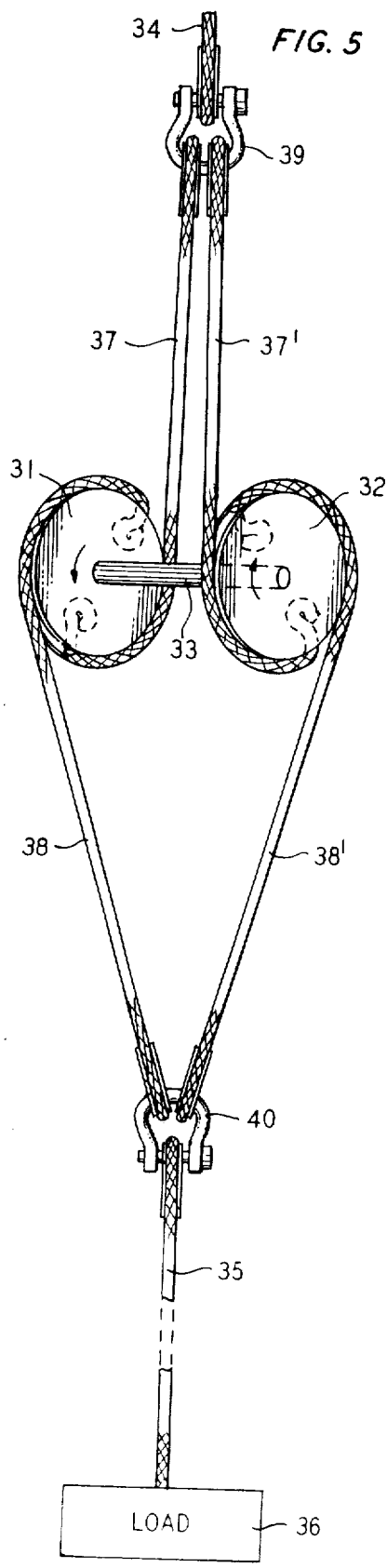
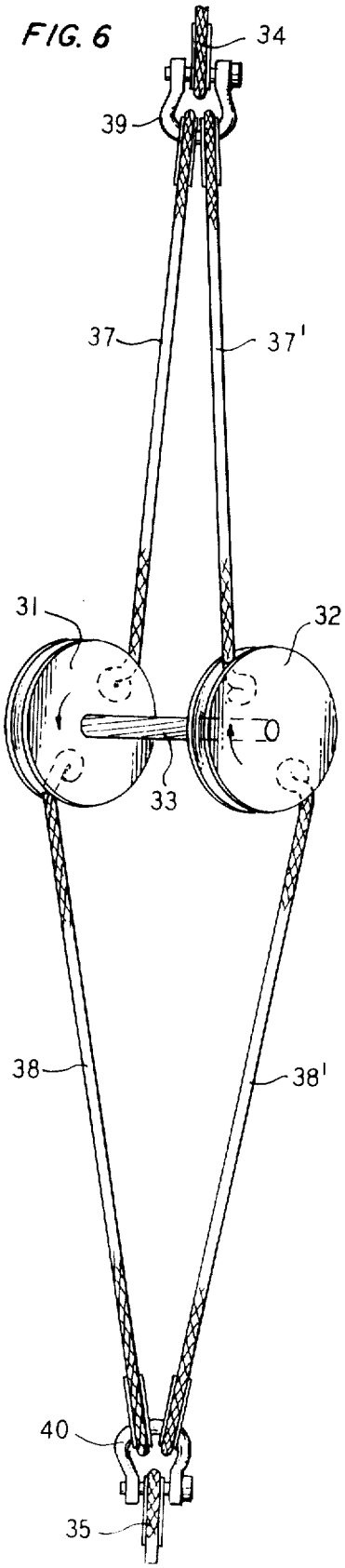

IMPACT ENERGY ABSORBER

BACKGROUND OF THE INVENTION

This invention relates to an impact energy absorber and, more particularly, to an improved impact energy absorber for use in protecting an equipment suspension system from high impact loads which might otherwise result from sudden accelerations of the suspended equipment.

Various types of equipment suspension systems are liable to be subjected to high impact loading. For example, some equipment suspension systems are carried on ships and are used for raising or lowering heavy payloads in a body of water, such as an ocean. Such a suspension system will receive high impact loading when a sudden downward motion of the ship causes the suspension line to become slack momentarily and then, quickly thereafter, become taut. This, in effect, produces a sudden jerk on the line, and the resulting high impact loading may generate kinetic energy in the suspended mass to such an extent as to break the suspension line with the consequent loss of the payload in the ocean.

Another example of an equipment suspension system that may be subjected to severely high impact loading is a suspension system employed for hanging electronic equipment racks from the ceiling of a strongly reinforced, or hardened, chamber which may be subjected to the effects resulting from the detonation of a nuclear weapon. In such an event, the shock loading created by a nuclear explosion would generate kinetic energy in the suspended equipment to such an extent that it might snap the suspension cables and thereby cause the electronic equipment to fall and become damaged.

SUMMARY OF THE INVENTION

Accordingly, the present invention is an impact energy absorber which is designed for use in preventing overloading of the tensile load in a suspension system carrying a mass which may have kinetic energy generated therein by high impact loading. The impact energy absorber comprises two parallel members having their centers connected by a torsion member. These three members thus form an H-frame which is disposed in a plane that is perpendicular to the longitudinal axis of the suspension system. Connecting means are provided for inserting the H-frame in series with the suspension system by joining one pair of its diagonally opposite ends to a portion of the suspension system that is above the H-frame and by joining its other pair of diagonally opposite ends to a portion of the suspension system that is below the H-frame.

Due to the above construction, the connecting means function as transforming means for transforming the tensile load of the suspension system into at least two tensile forces. The two parallel members act as translating means for translating the two tensile forces into respectively different torque loadings and for applying one of these torque loadings in one direction to one end of the torsion member and for applying the other of the torque loadings in a different direction to the other end of the torsion member. Thus, when a mass is suspended from the suspension system, the middle connecting member of the H-frame will be loaded in torsion.

This middle, or torsion, member of the H-frame is so designed and fabricated that it has a predetermined energy absorption capacity. Accordingly, when the normal tensile load in the suspension system tends to be increased by high impact loading, the torque loadings applied to the torsion member will be increased sufficiently by the compelling means comprising the connecting means and the parallel members so that the torsion member will yield in torsion to such an extent as to become twisted and permanently plastically deformed. In this manner, the impact energy absorber will absorb at least part of the kinetic energy of the mass thereby avoiding a break in the suspension system that might otherwise result from sudden accelerations of the suspended mass produced by high impact loading.

In a modification, several impact energy absorber units are connected in series to provide a greater energy absorption capacity. In another modification, the parallel members of the H-frame are constituted by two disks to provide a more nearly constant load level during the yielding process.

BRIEF DESCRIPTION OF THE DRAWING

The features of this invention are more fully discussed hereinafter in connection with the following detailed description of the drawing in which:

FIG. 1 is a perspective view of the impact energy absorber of this invention shown in its normal, or unoperated, condition;

FIG. 2 is a perspective view somewhat similar to FIG. 1 but showing the impact energy absorber in its operated, or deformed, condition;

FIG. 3 is a perspective view of a modified form of the invention having several impact energy absorber units connected in series and shown in their normal, or unoperated, condition;

FIG. 4 is another perspective view of the series connected impact energy absorber units but showing them in their operated, or deformed, condition;

FIG. 5 is a perspective view of a different modified form of the invention in which the parallel members of the H-frame are constituted by two disks shown in their normal, or unoperated, condition; and FIG. 6 is a perspective view somewhat similar to FIG. 5 but showing the modified impact energy absorber in its operated, or deformed, condition.

DETAILED DESCRIPTION

The impact energy absorber of this invention will now be described with reference to a specific exemplary embodiment thereof which, as is shown in FIG. 1, comprises an H-frame having two parallel members, or bars, 1 and 2 that are coupled together by a middle, or cross, member 3. These members 1, 2, and 3 are made of suitable rigid material, such as mild steel. The middle member 3 constitutes a torsion member having a predetermined energy absorption capacity. The ends of the torsion member 3 are fixedly attached to the center portions of the parallel members 1 and 2 by any suitable means, such as by welding with full penetration.

The impact energy absorber is connected in series with a load-carrying suspension system comprising an upper cable 4, which is to be understood as being connected to a hoist or winch on the deck of a ship, and a lower cable 5, which is connected to a mass, or a load, 6 in a body of water, such as an ocean. As can be seen in FIG. 1, the upper and lower cables 4 and 5 have a common longitudinal axis. The mass 6 thus imposes a tensile load upon the suspension system 4-5. The means for connecting the impact energy absorber to the suspension cables 4 and 5 include a plurality of tie rods 7 each having one end securely fastened to a respectively different one of a plurality of clevises 8. It is to be understood that, if desired, flexible cables may be substituted for the rigid tie rods 7.

Each clevis 8 is pivotally attached to a respectively different one of the four ends of the two parallel members 1 and 2 in the H-frame. One pair of diagonally opposite ends of the H-frame have their associated tie rods 7 connected to an upper shackle 9 which, in turn, is fastened to the lower end of the upper suspension cable 4. The other pair of diagonally opposite ends of the H-frame have their associated rods 7 connected to a lower shackle 10 which is secured to the upper end of the lower suspension cable 5. In this manner, as can be seen in FIG. 1, the H-frame is disposed with its plane perpendicular to the longitudinal axis of the suspension system. It should be noted that the tie rods 7 function as transforming means for transforming the tensile load of the suspension system into at least two tensile forces.

With the impact energy absorber thus connected in series in the load-carrying suspension system 4-5, it can be understood that, normally, the impact energy absorber is operating in a tension line. Therefore, under a normally steady load condition, the two parallel members 1 and 2 are horizontally disposed and the middle member 3 is loaded in substantially pure torsion. The parallel members 1 and 2 function as end-loaded cantilever beams and, due to their rigidity, they cause the natural frequency of this suspension system to be relatively high, which is a desirable characteristic for this particular application of the system.

When high impact loading is suddenly applied to the suspension system 4-5, such as in the manner described above, the parallel members 1 and 2 of the H-frame will function as translating means for translating the above-mentioned two tensile forces into respectively different torque loadings. The parallel members 1 and 2 will now apply one of these torque loadings in a clockwise direction to one end of the torsion member 3 and will also apply the other of these torque loadings in a counterclockwise direction to the other end of the torsion member 3, as viewed in FIG. 1.

Thus, the protective means comprising this impact energy absorber will transform the tensile load in the suspension system into two tensile forces which are translated into two torque loadings that are applied to opposite ends of the torsion member 3. When these torque loadings become sufficiently high, the torsion member 3 will yield in torsion and will become twisted as is indicated by the slanting lines drawn thereon in FIG. 2.

By choosing suitable materials and dimensions, the protective means comprising this impact energy absorber can be designed to have a predetermined energy absorption capacity suitable for accommodating virtually any specific limit load of practical interest. The term "limit load" is herein used as referring to the maximum load that can be carried by the suspension system without causing the cables 4 and 5 to break. For example, one embodiment of this invention has a limit load of 50 pounds and another embodiment has a limit load of 30,000 pounds.

Accordingly, when the applied torque loadings exceed a predetermined value, the torsion member 3 will absorb at least part of the kinetic energy of the suspended mass 6 by twisting and yielding in torsion so as to become permanently plastically deformed. This will be accompanied by rotary motion of the parallel members 1 and 2 in respectively different planes that are parallel to each other with the ends of the torsion member 3 acting as pivots. Specifically, as viewed in FIGS. 1 and 2, the parallel member 1 will rotate in a counterclockwise direction while the parallel member 2 will rotate in a clockwise direction. This will cause the H-frame to move from its original, or unoperated, position shown in FIG. 1, wherein it is disposed with its plane perpendicular to the suspension system 4-5, to its operated, or deformed, position shown in FIG. 2, wherein it is disposed with its plane approximately parallel to the longitudinal axis of the suspension system 4-5. During this movement of the H-frame, the load 6 will be lowered downward essentially through a distance nearly equal to the length of the parallel members 1 and 2.

Thus, the equipment suspension system 4-5 is protected from the effects of high impact loading because at least a portion of the kinetic energy of the suspended mass 6 is absorbed by the plastic deformation, or twisting, of the torsion bar 3 which forms the central member of the H-frame. In other words, the torsion member 3 constitutes a yielding member, or portion, of the overall suspension system and, when the tensile load in the system reaches a predetermined value, the torsion member 3 will absorb a large amount of energy at nearly constant load thus protecting the suspended mass 6 from excessive accelerations or decelerations and also protecting the cables 4 and 5 from breaking. In this way, a large amount of energy is absorbed by the twisting and permanent plastic deformation of the torsion member 3 in a relatively compact device.

It should be noted that the force applied to the cables 4 and 5 does not significantly increase until substantially all the kinetic energy of the suspended mass 6 is absorbed by the torsion member 3 which yields at a nearly constant torque level. Thus, the cables 4 and 5 are prevented from reaching their breaking load. In other words, the impact energy absorber of this invention is in series with the suspension system 4-5 and protects the cables 4 and 5 from any stress which might be greater than their breaking stress.

A modified form of the invention is illustrated in FIGS. 3 and 4 wherein it can be seen that several impact energy absorber units are connected in series for the purpose of providing a greater energy absorption capacity in an equipment suspension system carrying a load 16 by means of an upper cable 14 and a lower cable 15. The composite impact energy absorber shown in FIGS. 3 and 4 comprises three essentially similar H-frames. The upper H-frame includes two parallel members 11 and 12 having their center portions joined by a middle member 13 which functions as a torsion bar. The ends of the torsion member 13 are fixedly attached to the center portions of the parallel members 11 and 12 in the same manner that the torsion member 3, shown in FIG. 1, is attached to its associated parallel members 1 and 2.

One pair of diagonally opposite ends of this upper H-frame is connected to the upper cable 14 of the equipment suspension system. This is accomplished by pivotally attaching a clevis 18 to one end of one of the parallel members 11 and by pivotally attaching a similar clevis 18' to the opposite end of the other parallel member 12. A tie rod 17 has its lower end securely fastened to the clevis 18 and a similar tie rod 17' has its lower end similarly attached to the clevis 18'. The upper ends of the tie rods 17 and 17' are secured to a shackle 19 which is connected to the lower end of the upper cable 14.

The middle H-frame is disposed directly beneath the upper H-frame and comprises two parallel members 11' and 12' connected by a torsion member 13' in a manner similar to that described above. As is shown in FIGS. 3 and 4, a pair of hinge plates 21 is pivotally attached to the front end of the parallel member 11' and also to that end of the parallel member 11 which is opposite to the end to which the clevis 18 is attached. Similarly, another pair of hinge plates 22 is pivotally attached to that end of the parallel member 12 which is opposite to the end to which the clevis 18' is attached. This second pair of hinge plates 22 is also pivotally attached to the directly underlying end of the parallel member 12' in the middle H-frame.

The lower H-frame also comprises a similar construction of two parallel members 11" and 12" joined by a torsion member 13". A pair of hinge plates 23 is provided for pivotally joining the rear end of the parallel member 11' in the middle H-frame to the directly underlying end of the parallel member 11" in the lower H-frame. Another pair of hinge plates 24 is used for pivotally connecting the front end of the parallel member 12' in the middle H-frame to the immediately underlying end of the parallel member 12" in the lower H-frame.

A clevis 18" is pivotally attached to that end of the parallel member 11" which is opposite to the end to which the pair of hinge plates 23 is fastened. Similarly, another clevis 18'" is pivotally secured to that end of the parallel member 12" which is opposite to the end to which the pair of hinge plates 24 is connected. In this way, as can be seen in FIGS. 3 and 4, the clevises 18" and 18'" are connected to diagonally opposite ends of the lower H-frame.

The upper end of a tie rod 17" is fastened to the clevis 18" while the upper end of another tie rod 17'" is secured to the other clevis 18'". The lower ends of these tie rods 17" and 17'" are attached to a shackle 20 which is connected to the upper end of the lower cable 15. The result of this construction is that the composite impact energy absorber normally has its three H-frames so positioned that each of their respectively associated planes is disposed perpendicular to the longitudinal axis of the suspension system comprising the cables 14 and 15.

Since the three H-frames, including their torsion members 13, 13', and 13", are so fabricated as to be substantially identical, then, when high impact loading is applied to the equipment suspension system 14-15, all three of the H-frames in this composite impact energy absorber will act in unison to translate the linear load into a torsional load. Accordingly, this composite impact energy absorber will unfold and its three H-frames will move from their normally unoperated positions shown in FIG. 3 to their operated, or deformed, positions shown in FIG. 4 wherein each of the three torsion members 13, 13', and 13'' will have been twisted, as is indicated by the slanting lines drawn thereon in FIG. 4, for absorbing portions of the kinetic energy of the suspended mass 6.

Since each of the parallel members 11 to 12'', inclusive, in the three H-frames constitutes a moment arm about the attached end of its respectively associated torsion member 13, 13', and 13'', it can be seen that, when this composite impact energy absorber moves into its condition shown in FIG. 4, the total length of the moment arms will decrease until these moment arms move to positions wherein they are nearly aligned with the longitudinal axis of the equipment suspension system 14-15. Accordingly, the amount of kinetic energy that can be absorbed will be the sum of the energy absorption capacities of the three torsion members 13, 13', and 13''. Thus, the composite impact energy absorber shown in FIGS. 3 and 4 will have a greater energy absorption capacity than the impact energy absorber shown in FIGS. 1 and 2.

A different modified form of the invention is illustrated in FIGS. 5 and 6 wherein it can be seen that the parallel members of the H-frame are now constituted by two disks 31 and 32 for the purposes of extending the energy absorption capacity and also for providing a more nearly constant load level during the plastic yielding process of the torsion member 33. The ends of the torsion member 33 are fixedly attached to the center portions of the disks 31 and 32 in the same manner that the torsion member 3, shown in FIG. 1, is attached to its associated parallel member 1 and 2. Each of the disks 31 and 32 is formed with a circumferential rim.

This modified impact energy absorber is connected in series with an equipment suspension system comprising an upper cable 34, which is adapted to be fastened to a winch, and a lower cable 35, which is attached to a load 36. The lower end of the upper suspension cable 34 has a shackle 39 connected thereto. Two ropes, or wire cables, 37 and 37' extend from the shackle 39 to the disks 31 and 32. The upper ends of the ropes 37 and 37' are fastened to the shackle 39. The lower end of the rope 37 extends downward until it touches the right side of the disk 31 where it is wrapped around the lower portion of the rim of the disk 31 in a clockwise direction, as viewed in FIG. 5, for a distance of more than one-quarter of its circumference and is then securely attached to the disk 31 in any suitable manner. The lower end of the other rope 37' extends downward until it touches the left side of the disk 32 at which point it is wrapped around the lower portion of the rim of the disk 32 in a counterclockwise direction for a distance of more than one-quarter of its circumference and is then securely fastened thereto.

The upper end of the lower suspension cable 35 is connected to a shackle 40 which has two ropes, or wire cables 38 and 38' extending upward to the disks 31 and 32. The upper end of the rope 38 touches the left side of the disk 31 and is wrapped around the upper portion of its rim in a clockwise direction, as viewed in FIG. 5, for more than one-quarter of the circumference of the disk 31 and is then attached thereto in any convenient manner. The upper end of the other rope 38' touches the right side of the disk 32 and is wrapped around the upper portion of the rim of the disk 32 in a counterclockwise direction for more than one-quarter of its circumference and is then secured thereto. Thus, the ropes 38 and 38' serve to transform the tensile load of the suspension system into two tensile forces.

When high impact loading occurs, such as a sudden acceleration of the load 36, the disks 31 and 32 will translate the above-mentioned two tensile forces into respectively different torque loadings. One of these torque loadings will be applied to the left end of the torsion member 33 in such a manner as to tend to rotate it in a counterclockwise direction as viewed in FIG. 5. At the same time, the other torque loading will be applied to the right end of the torsion member 33 in an opposite manner so as to tend to rotate it in a clockwise direction. Thus, the linear load in the suspension system is translated into a torsional load.

When the torque loadings applied to the torsion member 33 become sufficiently strong, they will produce plastic yielding of the torsion member 33 which will accordingly become twisted as is represented by the slanting lines drawn thereon in FIG. 6. This will cause the left disk 31 to rotate in a counterclockwise direction while the right disk 32 will rotate in a clockwise direction thereby absorbing at least a portion of the kinetic energy of the suspended load 36.

During this rotation of the disks 31 and 32, the effective lengths of the ropes 37, 37', 38, and 38' will be extended. If the torsion member 33 is twisted sufficiently, it will permit each of the disks 31 and 32 to rotate more than 90° so that the ropes 37, 37', 38, and 38' will be extended to their maximum effective lengths as is shown in FIG. 6. Since it is possible for the disks 31 and 32 to rotate more than 90°, whereas the parallel members 1 and 2 of the impact energy absorber that is illustrated in FIGS. 1 and 2 cannot rotate more than 90°, it is evident that this greater degree of rotation, which is obtained in the impact energy absorber that is represented in FIGS. 5 and 6, functions to extend its energy absorption capacity.

It should be noted that the rims of the disks 31 and 32 constitute moment arms. Since the effective length of each of these moment arms is constant, this functions to provide a more nearly constant load level during the yielding process.

What is claimed is:

1. An impact energy absorber adapted for preventing overloading of the tensile load in a suspension system carrying a mass which may have kinetic energy generated therein by high impact loading, said suspension system including an upper portion and a lower portion with a common longitudinal axis, said impact energy absorber being interposed in series in said system between said upper and lower portions thereof and being characterized by comprising a torsion member provided with two ends and having a predetermined energy absorption capacity, said impact energy absorber further comprising transforming means for transforming said tensile load into at least two tensile forces, translating means for translating said tensile forces into respectively different torque loadings and for applying one of said torque loadings in one direction to one of said ends of said torsion member and for applying the other of said torque loadings in a different direction to the other of said ends of said torsion member, said torsion member being adapted to respond to said two applied torque loadings when they exceed a predetermined value by yielding and becoming permanently plastically deformed for thereby absorbing at least a portion of said kinetic energy of said mass, said translating means comprising at least two rotatable members disposed for rotation in respectively different planes that are parallel to each other, each of said rotatable members being constituted by a respectively different rigid bar, each of said bars being disposed parallel to the other of said bars, means for fixedly attaching each of said ends of said torsion member to a respectively different one of said bars for forming an H-frame, said H-frame being normally disposed with its plane perpendicular to said longitudinal axis of said suspension system, said bars in said H-frame having two different pairs of diagonally opposite ends, said transforming means including first connecting means for connecting one of said pairs of diagonally opposite ends to said lower portion of said suspension system, and said transforming means further including second connecting means for connecting the other of said pairs of diagonally opposite ends to said upper portion of said suspension system.

2. An impact energy absorber adapted for preventing overloading of the tensile load in a suspension system carrying a mass which may have kinetic energy generated therein by high impact loading, said suspension system including an upper portion and a lower portion with a common longitudinal axis, said impact energy absorber being interposed in series in said system between said upper and lower portions thereof and being characterized by comprising a torsion member provided with two ends and having a predetermined energy absorption capacity, said impact energy absorber further comprising transforming means for transforming said tensile load into at least two tensile forces, translating means for translating said tensile forces into respectively different torque loadings and for applying one of said torque loadings in one direction to one of said ends of said torsion member and for applying the other of said torque loadings in a different direction to the other of said ends of said torsion member, said torsion member being adapted to respond to said two applied torque loadings when they exceed a predetermined value by yielding and becoming permanently plastically deformed for thereby absorbing at least a portion of said kinetic energy of said mass, said translating means comprising at least two rotatable members disposed for rotation in respectively different planes that are parallel to each other, each of said rotatable members being constituted by a respectively different rigid disk, each of said disks being disposed in a plane parallel to the plane in which the other of said disks is disposed, and means for fixedly attaching each of said ends of said torsion member to the center of a respectively different one of said disks.

3. An impact energy absorber in accordance with claim 2 wherein said transforming means include means for effecting the simultaneous rotation of said disks in respectively opposite directions about said respectively attached ends of said torsion member to a maximum extent of more than 90°.

4. An impact energy absorber in accordance with claim 2 wherein each of said disks is formed with a circumferential rim, wherein said transforming means comprise first connecting means for connecting one of said disks to said lower portion of said system, second connecting means for connecting the other of said disks to said lower portion of said suspension system, third connecting means for connecting one of said disks to said upper portion of said system, and fourth connecting means for connecting the other of said disks to said upper portion of said system, said first and third connecting means each being wrapped around respectively different portions of the rim of one of said disks for an extent of more than one-quarter of its circumference, and said second and fourth connecting means each being wrapped around respectively different portions of the rim of the other of said disks for an extent of more than one-quarter of its circumference.

5. In a suspension system having tensile loading produced by a mass which is carried thereby and which may be subjected to sudden high impact loading, said suspension system including an upper portion and a lower portion with a common longitudinal axis, an impact energy absorber connected in series in said system between said upper and lower portions thereof and adapted for protecting said system from the effects of said high impact loading by translating said tensile loading into torsional loading, said impact energy absorber being characterized by having an H-frame normally disposed with its plane perpendicular to said longitudinal axis of said suspension system, said H-frame comprising two rigid parallel members and a rigid middle member, said parallel members having two different pairs of diagonally opposite ends, said middle member having two ends, means for fixedly attaching each of said ends of said middle member to the center portion of a respectively different one of said parallel members, and compelling means for compelling said middle member to yield in torsion and to enter a state of permanent plastic deformation, said compelling means including means for changing said tensile loading of said suspension system into two tensile forces and for oppositely applying said forces to said ends of said parallel members for effecting the simultaneous rotation of said two parallel members in respectively opposite directions about said respectively attached ends of said middle member to a maximum extent of 90° thereby moving said H-frame into a plane parallel to said longitudinal axis of said suspension system.

* * * * *